United States Patent
Tsai et al.

(10) Patent No.: US 8,183,807 B2
(45) Date of Patent: May 22, 2012

(54) METHOD OF DRIVING DC MOTOR AND RELATED CIRCUIT FOR AVOIDING REVERSE CURRENT

(75) Inventors: Ming-Jung Tsai, Chang-Hua (TW); Ching-Sheng Li, Hsinchu County (TW); Kun-Min Chen, Changhua County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 331 days.

(21) Appl. No.: 12/647,556

(22) Filed: Dec. 28, 2009

(65) Prior Publication Data

US 2011/0062910 A1  Mar. 17, 2011

(30) Foreign Application Priority Data

Sep. 11, 2009 (TW) .............................. 98130674 A (51) Int. Cl.
*H02P 6/18* (2006.01)
(52) U.S. Cl. ......... 318/400.35; 318/400.34; 318/400.32; 318/400.01; 318/700
(58) Field of Classification Search ............. 318/400.35, 318/400.34, 400.32, 400.01, 700
See application file for complete search history.

(56) References Cited

U.S. PATENT DOCUMENTS

| 6,552,505 B2 * | 4/2003 | Naito .............................. 318/63 |
| 6,563,284 B2 * | 5/2003 | Teutsch et al. ................ 318/599 |
| 7,023,155 B2 * | 4/2006 | Tieu .............................. 318/276 |
| 7,411,367 B2 | 8/2008 | Tsai |

OTHER PUBLICATIONS

Tsai, Tile of Invention: Current Limit Control Method of DC Motor and Related Device and Circuit, U.S. Appl. No. 12/512,024, filed Jul. 30, 2009.

* cited by examiner

*Primary Examiner* — Walter Benson
*Assistant Examiner* — David Luo
(74) *Attorney, Agent, or Firm* — Winston Hsu; Scott Margo (57) ABSTRACT

A motor driving method for driving a direct-current (DC) motor, designed for avoiding a reverse current induced by the Back Electromotive Force (BEMF), includes providing a driver circuit for driving the DC motor; comparing a signal level of a terminal of the DC motor and a predetermined voltage value to produce a comparing result; and controlling a specific lower gate switch to avoid the occurrence of a reverse current of the DC motor according to the comparing result.

11 Claims, 12 Drawing Sheets

METHOD OF DRIVING DC MOTOR AND RELATED CIRCUIT FOR AVOIDING REVERSE CURRENT

BACKGROUND OF THE INVENTION

1. Field of the Invention

The present invention is related to a DC motor control method for avoiding the reverse current, and more particularly, to a DC motor control method which can prevent the reverse current induced by Back Electromotive Force (BEMF) inherent in a DC motor.

2. Description of the Prior Art

A DC (direct current) motor has very wide application in our everyday life. For example, fans installed on a CPU, or on a casing of a personal computer or inside a projector, and these are the cases which the DC motor are used for dissipating heat; other cases like stirrers, toys or robots are also using DC motors for various purposes. Generally speaking, the working principle of a DC brushless motor is to conduct a current through a stator coil of the DC motor to generate a magnetic field, and then the magnetic field is interacted with the magnetic field of a rotor (armature) to generate mechanical torque. Meanwhile, the DC motor can generate a Back Electromotive Force whose polarity is opposite to the polarity of the applied voltage. The Back Electromotive Force is naturally generated when the DC motor is running and is related to constitutive materials and a rotating speed of the motor, and can reduce the magnitude of the motor current.

Figure 1:
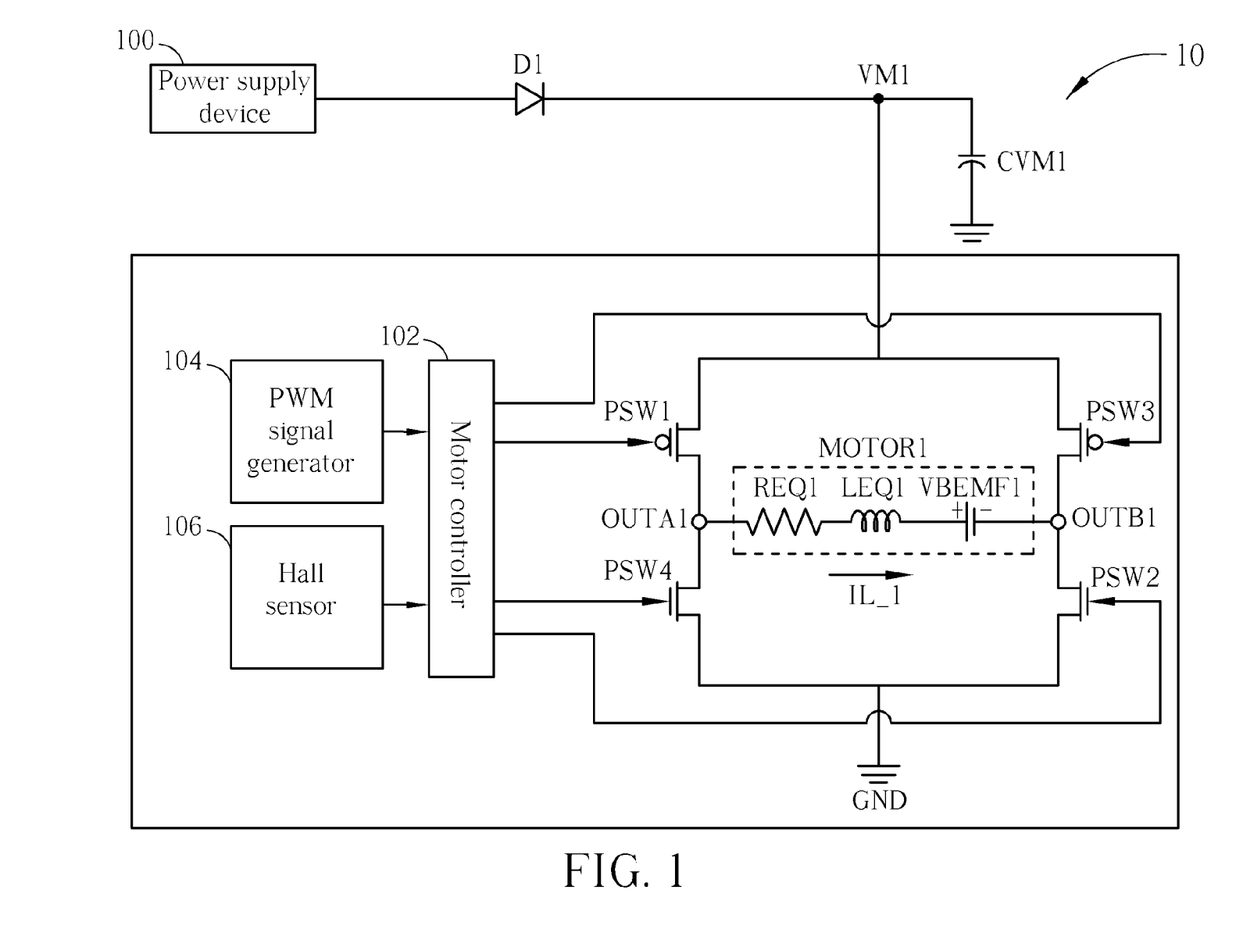
FIG. 1 illustrates a schematic diagram of a DC motor control circuit of the prior art.

Please refer to FIG. 1, which illustrates a schematic diagram of a DC motor control circuit 10 of the prior art. The DC motor control circuit 10 is mainly utilized to control a DC motor MOTOR1, and is composed of a power supply device 100, a motor controller 102, power switches PSW1~PSW4, a PWM (pulse width modulation) signal generator 104 and a Hall sensor 106. Furthermore, the DC motor control circuit 10 includes a capacitor CVM1 to stabilize voltage, and a diode D1, which is used for protecting the power supply device 100. Inside FIG. 1, the DC motor MOTOR1 is represented by an inductor LEQ1, a voltage source representing a Back Electromotive Force VBEMF1, and a resistor REQ1. In many applications of DC motors, a pulse width modulation (PWM) technique is utilized to control the magnitude of the motor current, such that electric energy can be saved and the rotating speed can be set under control. PWM technique can also regulate energy delivered to the load (which is the DC motor MOTOR1 in this case) from the power supply device 100 by changing the length of the turn-on time within a machine cycle, and the ratio of the turn-on time relative to length of a period is often called the duty cycle. When the duty cycle approaches 1.0, it represents the power supply device 100 is delivering the energy to the load almost in full capability; on the other hand, if the duty cycle approaches 0, it represents the power supply device 100 is only sending very limited power to the load. Besides that, the control of the DC motor needs the Hall sensor 106 to provide a sensing signal, which can indicate the current positions of the armatures and the rotating speed of the DC motor MOTOR1; therefore the DC motor MOTOR1 may include one or more Hall sensors to help controlling the switching operations of the power switches PSW1~PSW4, such that the DC motor MOTOR1 can be operated more conveniently and precisely.

Please keep referring to FIG. 1, the motor controller 102 receives signals produced by the PWM signal generator 104 and the Hall sensor 106, and generates four timing control signals to control the switching operations of the power switches PSW1~PSW4, wherein the power switches PSW1~PSW4 constitute an H-bridge. According to detecting results of the Hall sensor 106, which are mainly related to positions of the armature, the motor controller 102 operates alternatively in two motor driving states (the first motor driving state and the second motor driving state) to supply electrical energy to the motor MOTOR1. In the first motor driving state, the motor controller 102 turns on the upper gate bridge PSW1 and the lower gate bridge PSW2, such that current can be conducted from the power supply device 100, through the upper gate bridge PSW1 and then through the motor MOTOR1, and finally directed to the ground via the lower gate bridge PSW2; electrical energy is delivered to the motor MOTOR1 in this way while in the first motor driving state. In the second motor driving state, the motor controller 102 turns on the upper gate bridge PSW3 and the lower gate bridge PSW4, such that current can be conducted from the power supply device 100, through the upper gate bridge PSW3, then the motor MOTOR1, and finally directed to the ground via the lower gate bridge PSW4; electrical energy is delivered to the motor MOTOR1 while in the second motor state. By operating between the first motor control state and the second motor control state in turn, the motor can be rotated smoothly. Besides that, the motor controller 102 can regulate the amount of electrical energy delivered to the motor MOTOR1 by changing the duty cycle of the PWM signal, such that the motor speed can be properly controlled and the circuit can be of higher energy efficiency.

Figure 2A:
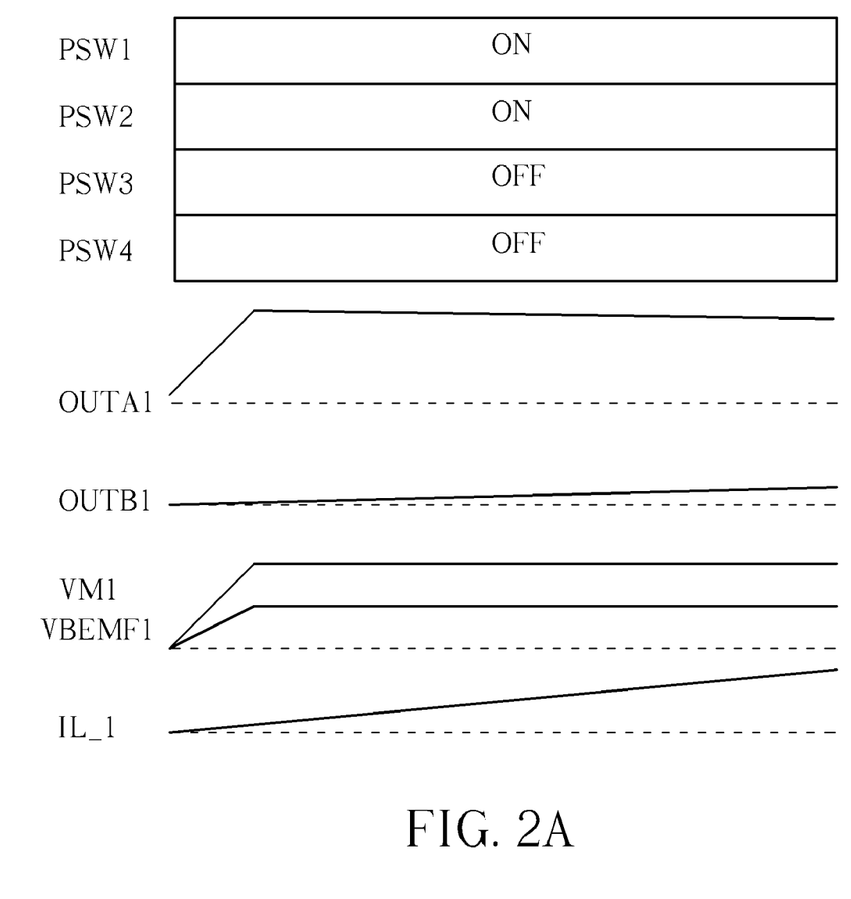
FIG. 2A illustrates operating states of power switches and timing diagrams of circuit nodes after the DC motor control circuit of FIG. 1 starts to deliver energy to a DC motor.
Figure 2B:
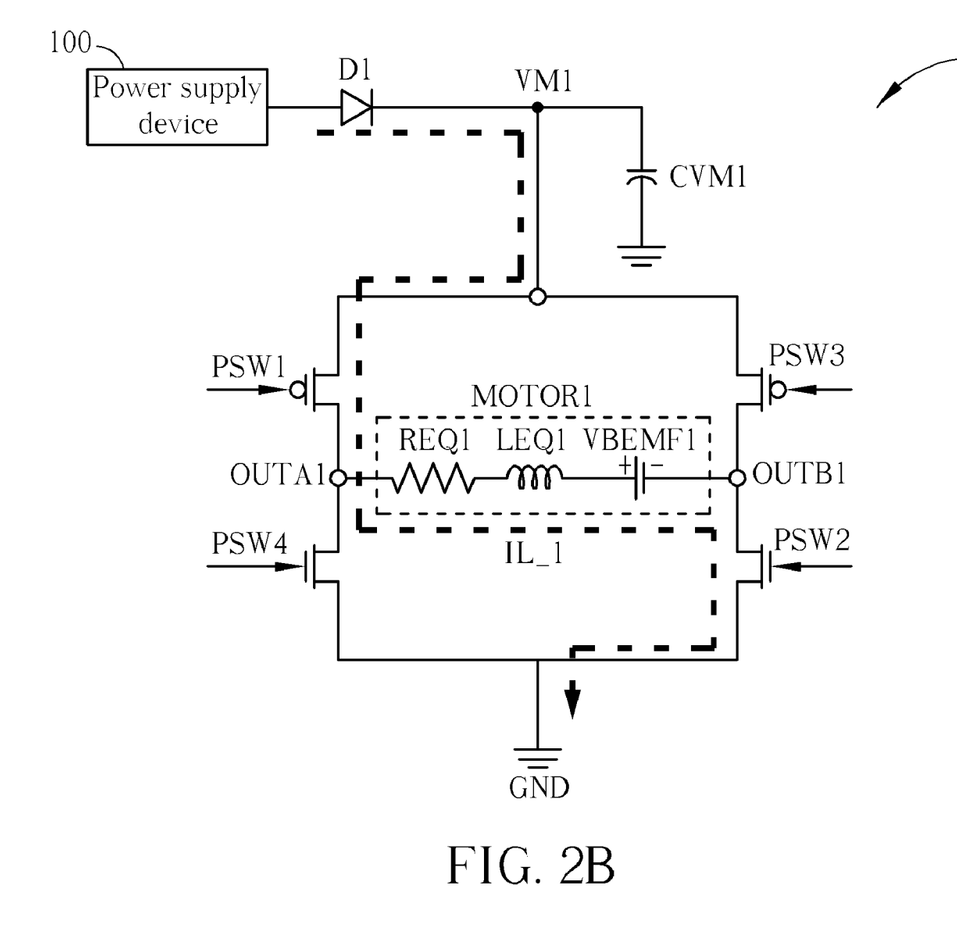
FIG. 2B illustrates a schematic diagram displaying a direction of current when the DC motor control circuit of FIG. 1 starts to deliver energy to a motor.

Please refer to FIGS. 2A and 2B. FIG. 2A illustrates operating states of the power switches PSW1~PSW4 and timing diagrams of the related circuit nodes after the DC motor control circuit 10 starts to deliver energy to the motor MOTOR1, and FIG. 2B illustrates a schematic diagram showing the direction of the current when the DC motor control circuit 10 starts to deliver energy to the motor MOTOR1. For clarity, FIG. 2A only includes the timing diagrams of the terminals OUTA1, OUTB1 of the motor, the endpoint VM1, the corresponding Back Electromotive Force VBEMF1 of the motor, and the motor current IL_1, to show the operating conditions in the first motor driving state. Inside, the voltage levels of the terminals OUTA1 and OUTB1 can be expressed as the following equation:

$$V_{OUTA1} = V_{VM1} - IL\_1 \cdot R_{DS\text{-}ON},$$

and $$V_{OUTB1} = IL\_1 \cdot R_{DS\text{-}ON}.$$

According to the equations above, $V_{OUTA1}$ and $V_{OUTB1}$ respectively represent the voltage levels at the terminals OUTA1 and OUTB1; $V_{VM1}$ represents the voltage value at the endpoint VM1, and $R_{DS\text{-}ON}$ represents the conducting resistance of the related power switch. Also, in FIG. 2A, since the power switches PSW1 and PSW2 have been turned on by the motor controller 102, the power supply device can deliver energy to the motor, and the motor current IL_1 can increase with a positive slope. The value of the slope can be expressed as the following equation:

$$m_{UP} = \frac{V_{VM1} - (REQ1 \cdot IL\_1) - VBEMF1}{LEQ1}$$

where $m_{UP}$ represents the rising slope of the motor current IL_1, and the resistor REQ1 represents the internal resistance of the motor MOTOR1. Noteworthily, since the conducting resistance of the power switch imposes comparatively less influence on the value of slope $m_{UP}$, it is ignored in the equations above for simplicity.

Figure 2C:
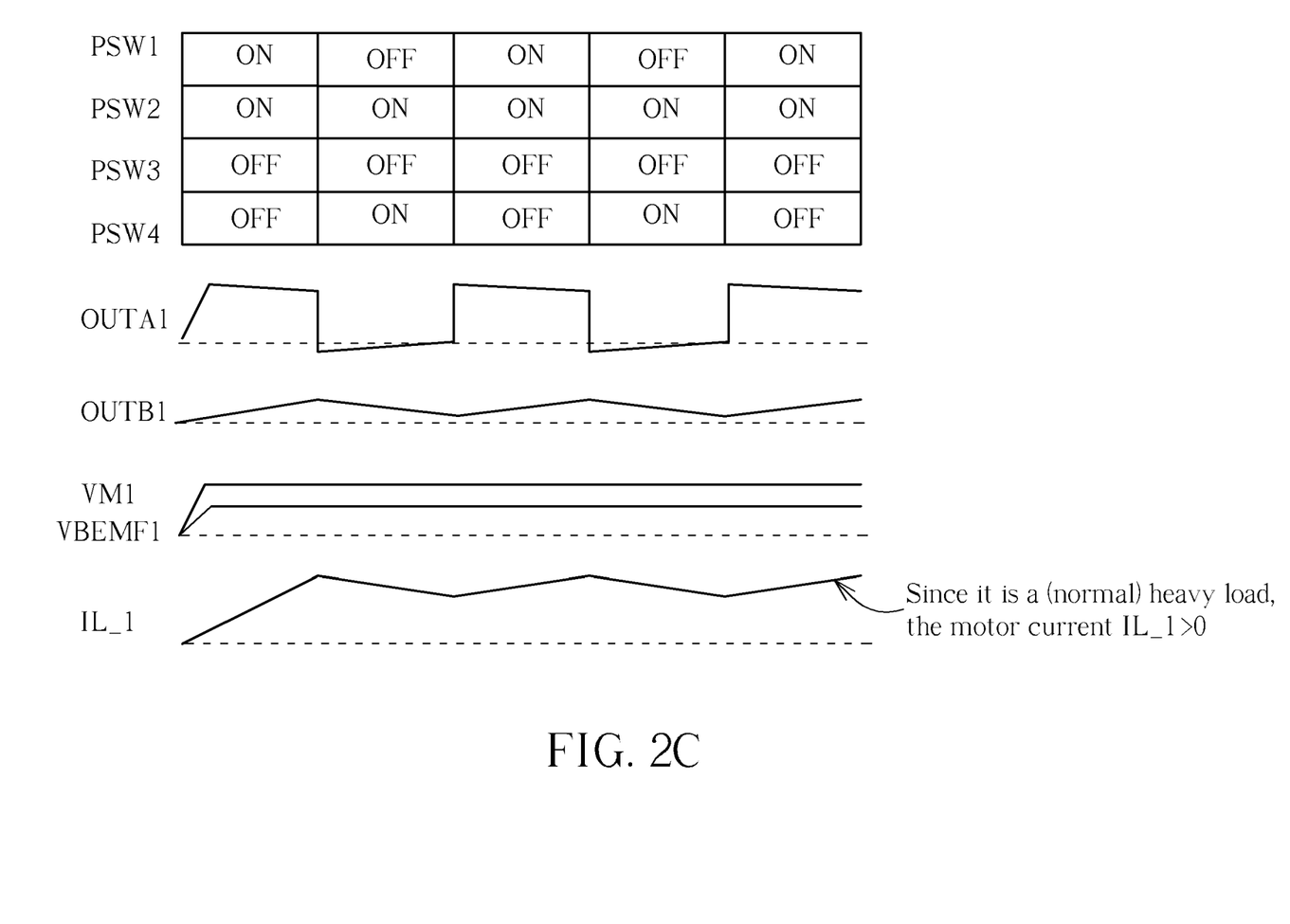
FIG. 2C illustrates a schematic diagram of states of power switches and timing diagrams of circuit nodes for first several PWM periods after the DC motor control circuit of FIG. 1 starts to deliver energy to a motor.
Figure 2D:
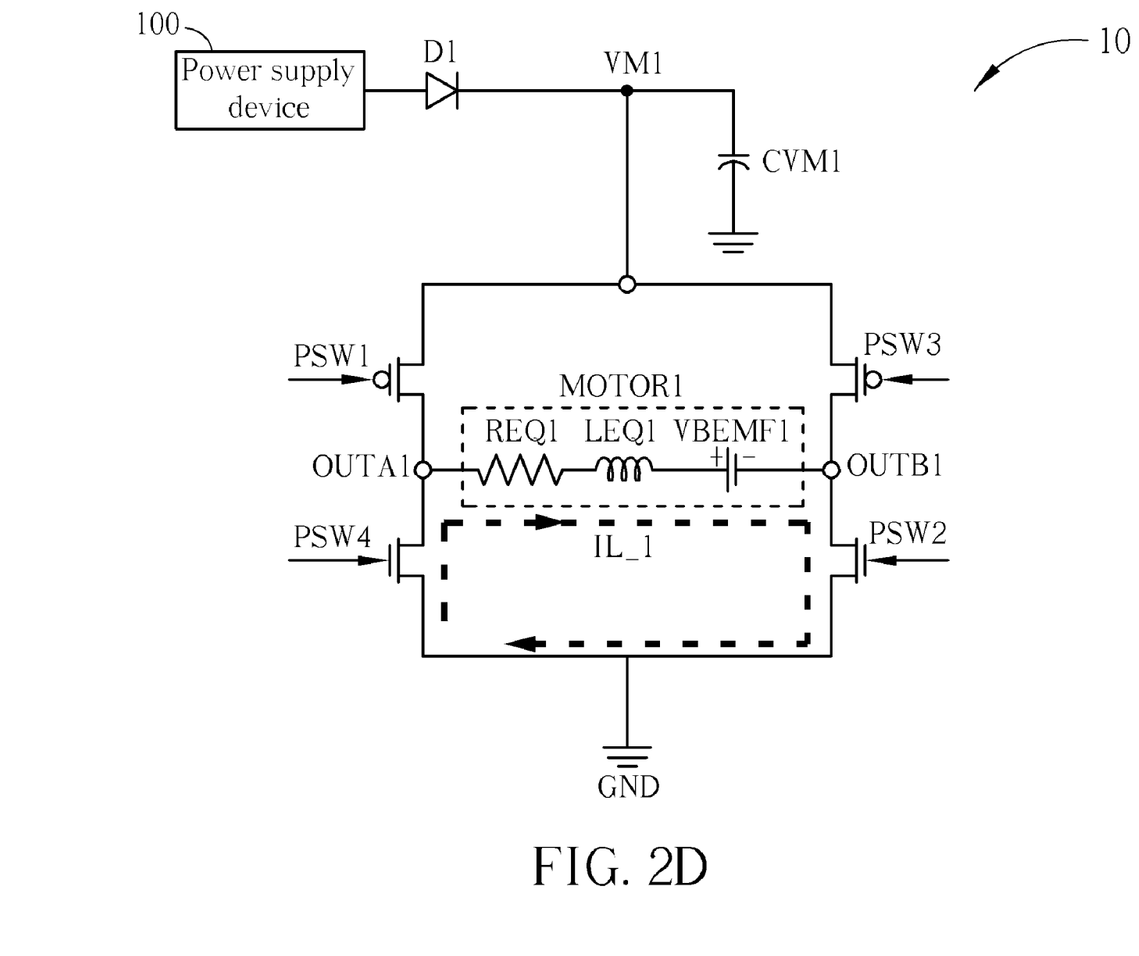
FIG. 2D illustrates a schematic diagram demonstrating a direction of current in the DC motor control circuit of FIG. 1 while a power switch is turned off.

Please refer to FIG. 2C, which covers the operating conditions for more PWM cycles than FIG. 2A. Still operated in the first motor driving state as shown in FIG. 2A, and the PWM scheme is applied to regulate the magnitude of the motor current, FIG. 2C illustrates a schematic diagram of the states of the power switches PSW1~PSW4 and timing diagrams of the related circuit nodes for the first several PWM periods after the DC motor control circuit 10 starts to deliver energy to the motor MOTOR1. Inside FIG. 2C, it shows that when the power switch PSW1 is turned off, the power supply unit stops providing power to the motor MOTOR1, and the motor current IL_1 starts to decrease with a negative slope, which can be expressed as the following equation:

$$m_{DOWN} = \frac{VBEMF1 - (REQ1 \cdot IL\_1)}{LEQ1},$$

where $m_{DOWN}$ represents the falling slope of the motor current IL_1. Besides that, please refer to FIG. 2D, which illustrates a schematic diagram demonstrating the direction of the current in the DC motor control circuit 10 while the power switch PSW1 is turned off. Similarly, since the conducting resistance of the power switch imposes comparatively less influence on the value of slope $m_{UP}$, it is ignored in the equation above for simplicity.

While in normal operation, the motor controller 102 can use the PWM technique to control the motor speed and save the energy. Within a PWM period (cycle), as the PWM signal is in the high voltage level (PWM=High), the motor controller 102 turns on an upper gate switch such that the electrical energy is transferred to the motor MOTOR1, and the motor current IL_1 is increased according to the rising slope as stated above; on the other hand, when the PWM signal is in the low voltage level (PWM=Low), the motor controller 102 turns off the upper gate switch, and stops delivering the electrical energy to the motor MOTOR1, and it shows that the motor current IL_1 will decrease according to the falling slope (as stated above) till the end of the current PWM cycle.

Figure 3A:
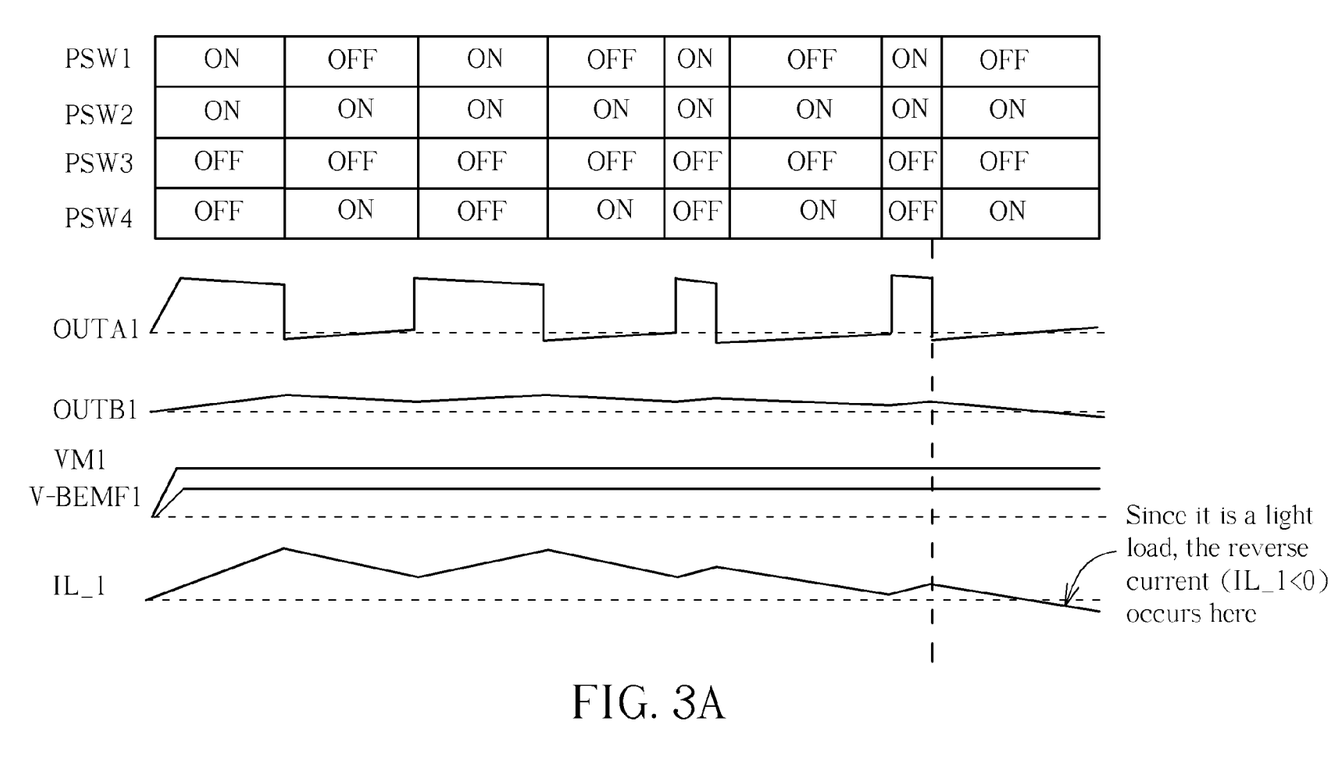
FIG. 3A illustrates a schematic diagram of states of power switches and timing diagrams of circuit nodes in the DC motor control circuit of FIG. 1 while a duty cycle of a PWM signal exhibits a sudden change.
Figure 3B:
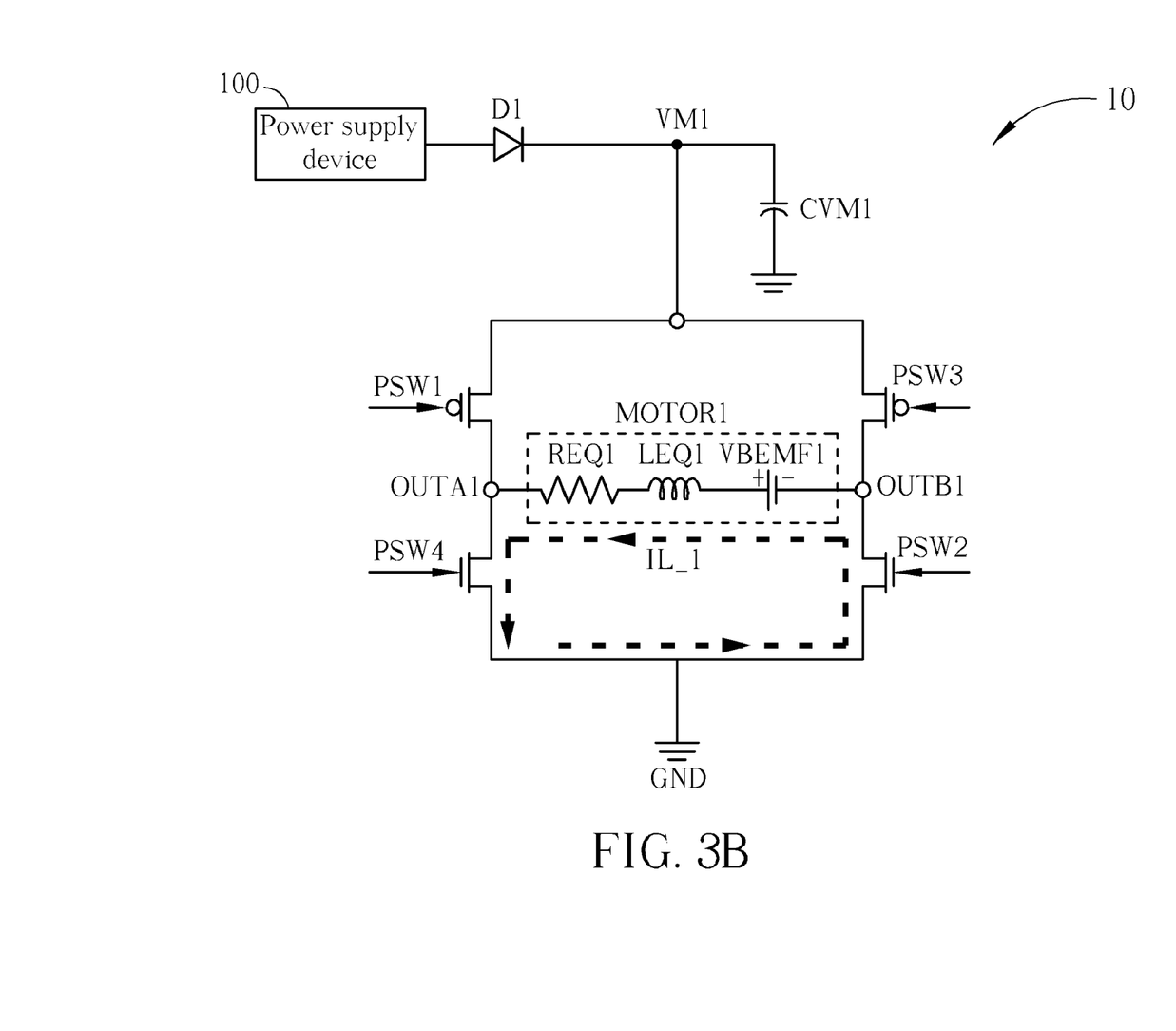
FIG. 3B illustrates a schematic diagram demonstrating a direction of reverse current in the DC motor control circuit of FIG. 1 while operating in a first motor driving state.

For some applications, the motor speed needs to be decreased largely within a very short period of time, and this can be realized by regulating the duty cycle of the PWM signal. Please refer to FIG. 3A, which illustrates a schematic diagram of states of the power switches PSW1~PSW4 and timing diagrams of the related circuit nodes in the DC motor control circuit 10 while the duty cycle of the PWM signal exhibits a sudden change. In this case, if the duty cycle suddenly drops from 90% to 10%, at that moment (within a short time), the motor will keep rotating in a high speed owing to the rotational inertia of the rotor. Also, since the motor's Back Electromotive Force VBEMF1 is closely related to the rotational inertia of the rotor, so the motor's Back Electromotive Force VBEMF1 will change with a much slower pace (actually, the VBEMF1 is nearly unchanged). Under this condition, the time for the upper gate of power switch (i.e. PSW1 in first motor driving state) to stay in the OFF state is much longer than the time to stay in the ON state (in a PWM cycle), and since the motor's Back Electromotive Force VBEMF1 keeps relatively stable, the motor current IL_1 will exhibit stronger downward tendency than upward, and the average level of the motor current IL_1 will keep falling. When the level of the motor current IL_1 falls below 0 Amp and becomes negative, the reverse current takes place. Please refer to FIG. 3B, which illustrates a schematic diagram demonstrating a direction of the reverse current in the DC motor control circuit 10 while operating in the first motor driving state.

Figure 3C:
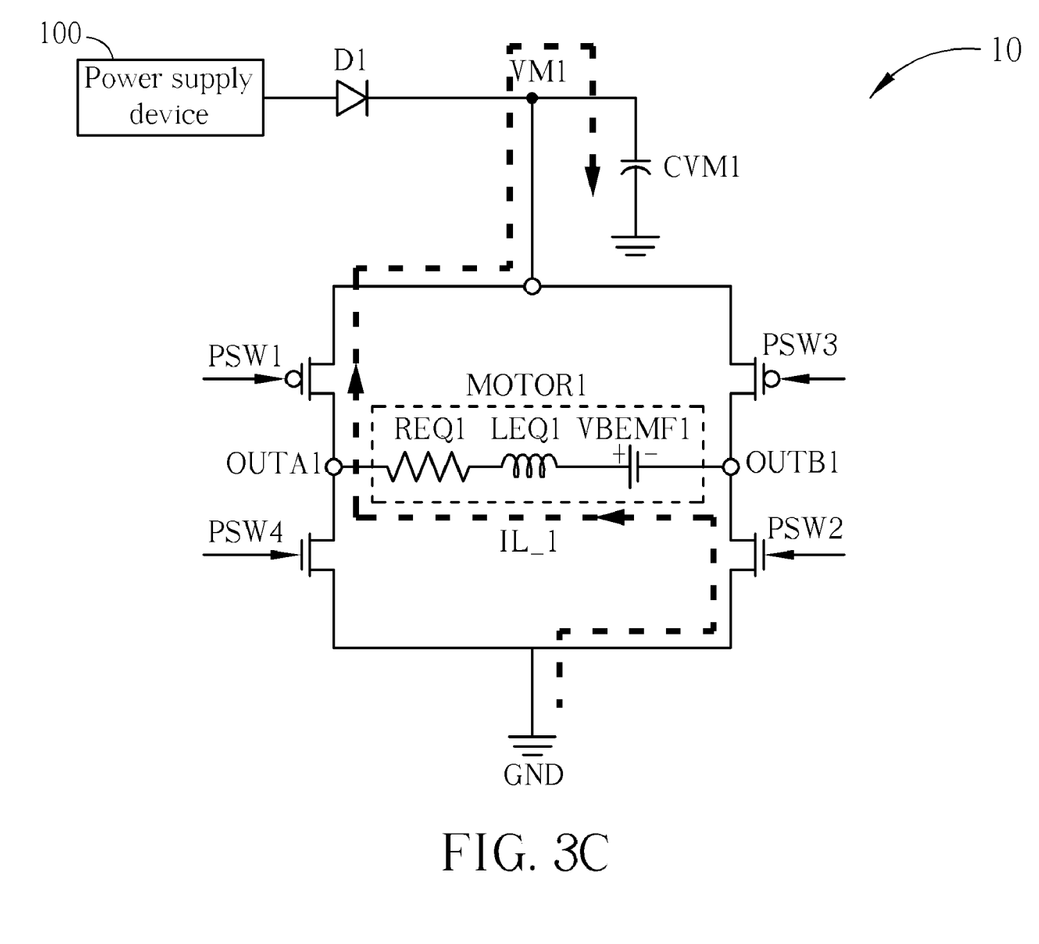
FIG. 3C illustrates a schematic diagram demonstrating a condition when reverse current happens and flows to a surge protection capacitor in the DC motor control circuit of FIG. 1 while operating in a first motor driving state.

The aforementioned reverse current may damage the circuit under some conditions. For example, while there is reverse current existed, and when the PWM signal again switches from the low voltage level (PWM=Low) to the high voltage level (PWM=High) (equivalently speaking, for the first motor driving state, PSW4 is turned off, and PSW1 is turned on), and since the motor current IL_1 needs to keep its continuity all the time, so the motor current IL_1 will keep running in the original direction (flowing from endpoint OUTB1 to endpoint OUTA1). However, since the power switch PSW4 is shut off, so the motor current can only be directed to the power switch PSW1, passing the endpoint VM1, and then directed to the power supply device 100, and this reverse current may seriously damage the power supply device 100. Furthermore, if the system adds a diode D1 for protecting the power supply device 100, then the reverse current (of the motor current IL_1) can only be directed to the capacitor CVM1 after passing the endpoints VM1, but this will escalate the voltage level on the endpoint VM1, and the control circuit may be burned. Please refer to FIG. 3C, which illustrates a schematic diagram demonstrating the condition when the reverse current happens and flows to the capacitor CVM1 in the DC motor control circuit 10 while operating in the first motor driving state. However, in order to prevent any damage to the circuit, the capacitance of the bypass capacitor CVM1 (as well as the size of the capacitor CVM1) needs to be of a larger value (and so the size of the capacitor will become larger); this will increase the component cost and take more space out of the printed circuit board. To explore the origin of the reverse current, it was mainly because there is a Back Electromotive Force VBEMF1 existed in the DC motor. However, the happening of the Back Electromotive Force VBEMF1 is a natural consequence of the running DC motor MOTOR1, and cannot be avoided. Therefore, designer(s) should consider other ways around to prevent the happening of the reverse current.

By the way, U.S. Pat. No. 7,411,367 discloses a DC motor driving method for preventing another kind of reverse current occurring while switching between the first motor driving state and the second motor driving state, and is not designed for preventing the reverse current induced from instantaneous change from the heavy load to the light load within the same motor driving state. U.S. Pat. No. 7,411,367 is inappropriate to resolve the issue made by the Back Electromotive Force inherent in a DC motor as stated above.

SUMMARY OF THE INVENTION

Therefore, the main objective of the present invention is to provide a DC motor control method to avoid the reverse current induced by the Back Electromotive Force.

The present invention discloses a motor driving method, for avoiding the reverse current induced by Back Electromotive Force comprises providing a driving current to drive the direct-current (DC) motor; comparing a signal level of a terminal of the DC motor with a predetermined voltage value to produce a comparing result; and controlling a specific lower gate switch to avoid the occurrence of a reverse current of the DC motor according to the comparing result.

The present invention further discloses a direct-current (DC) motor control circuit for driving a DC motor, which avoids the occurrence of reverse current induced by the Back Electromotive Force, and the control circuit comprises a power supply unit for providing a driving current to drive the DC motor; a comparing unit for comparing a signal level of a terminal of the DC motor with a predetermined voltage value to produce a comparing result; and a control unit for controlling a specific lower gate switch to avoid the occurrence of a reverse current of the DC motor according to the comparing result.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
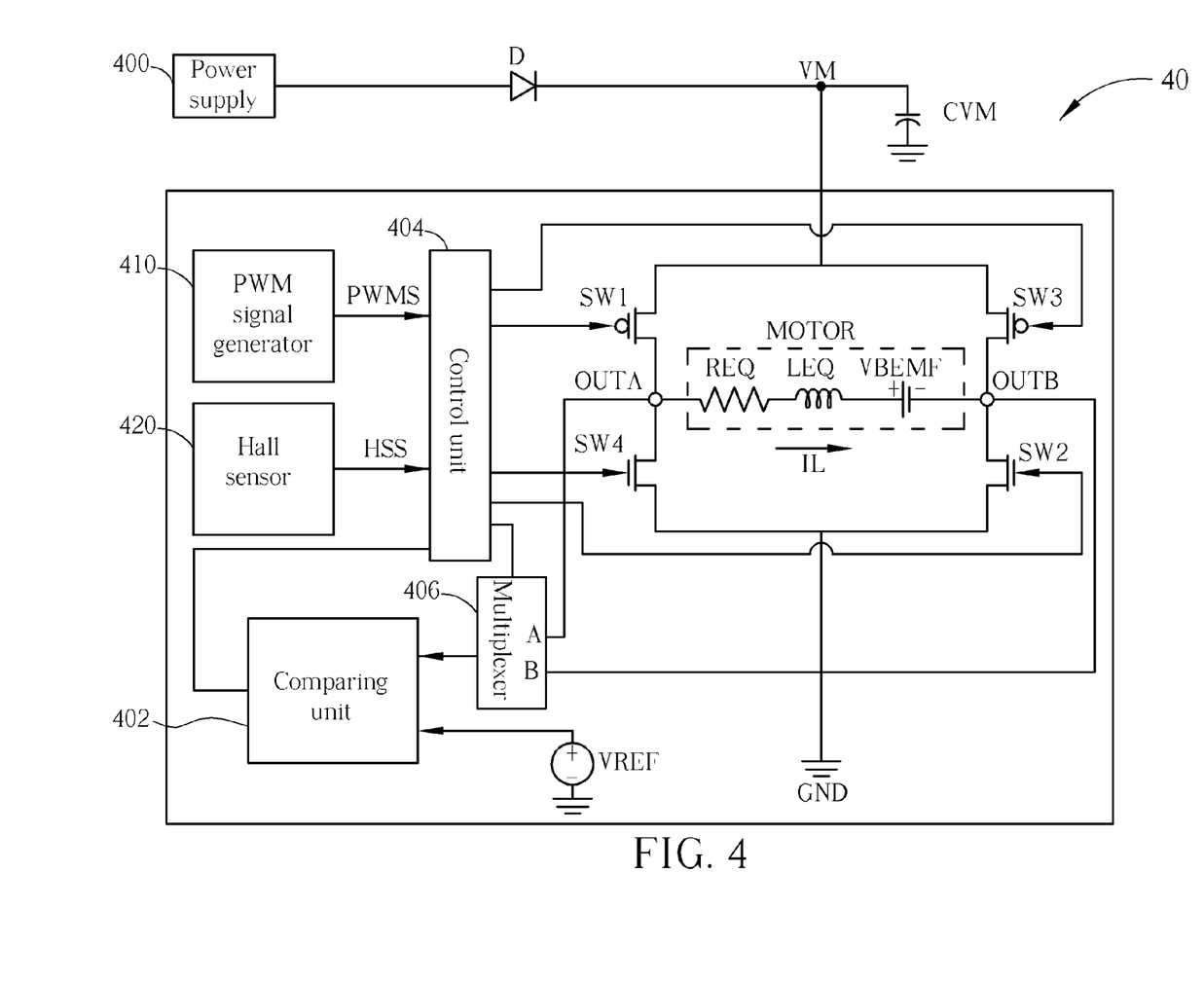
FIG. 4 illustrates an architecture diagram of a DC motor control circuit according to an embodiment of the present invention.

To completely solve the reverse current problem, please refer to FIG. 4, which illustrates an architecture diagram of a DC motor control circuit 40 according to an embodiment of the present invention. The DC motor control circuit 40 is utilized to control a DC motor MOTOR0, and includes a power supply 400, power switches SW1~SW4, a comparing unit 402, a control unit 404 and a multiplexer 406. The power switches SW1~SW4 constitute an H bridge. The power supply 400 is used to supply electric power to the motor MOTOR0 and the rest of the circuit. The comparing unit 402 is utilized to compare the voltage level of motor terminals (OUTA or OUTB) with a predetermined voltage value VREF, such that a comparing result CS can be generated. The control unit 404 is utilized to control the switching operations of the power switches SW1~SW4 according to the comparing result CS. Besides this, the DC motor control circuit 40 further comprises a PWM signal generator 410 and a Hall sensor 420, and is utilized to generate PWM signal PWMS and magnetic field sensing signal HSS to assist the DC motor MOTOR0 to carry out related timing control, which includes controlling the switching operations of the power switches SW1~SW4. Usually, the power switches SW1, SW3, which located between the power supply device 400 and the DC motor MOTOR0 are called upper gate switches, and the power switches SW2, SW4, which located between the motor MOTOR0 and the ground are called lower gate switches. Also, the DC motor circuit 40 further comprises a bypass capacitor CVM, and a diode D for protecting the power supply device 400. Inside FIG. 4, the DC motor MOTOR0 is represented by an equivalent inductor LEQ, a voltage source representing the equivalent Back Electromotive Force VBEMF, and an equivalent resistor REQ. Noteworthily, FIG. 1 demonstrates an embodiment of the present invention which is applied to a single-phase, single-coil DC motor, and is for clearly demonstrating the operating principles of the present invention. In fact, the operating principles of the present invention can be readily applied to the control circuits of other types of DC motor (for example, multi-phase, multi-coil motors).

According to the rotor position detected by the Hall sensor 420, the DC motor control circuit 40 can be operated in two motor driving states to supply current to the motor MOTOR0 such that the motor MOTOR1 can function normally. In the first motor driving state, the control unit 404 turns on the upper gate switch SW1 and the lower gate switch SW2, such that the current can be conducted from the power supply device 400, through the upper gate switch SW1, the DC motor MOTOR0, and finally directed to the ground via the lower gate switch PSW2, and the electrical power can be delivered to the motor MOTOR1 in this way. In the second motor driving state, the motor controller 102 turns on the upper gate switch PSW3 and the lower gate switch PSW4, such that the current can be conducted from the power supply device 100, and flowing through the upper gate switch PSW3, the motor MOTOR0, and finally directed to the ground via the lower gate switch PSW4, and the electrical power can be delivered to the motor MOTOR1. By switching between the first motor control state and the second motor control state, the motor can be operated normally. Besides that, the multiplexer 406 can be utilized to select the voltage level of terminal OUTA or terminal OUTB according to the current motor driving state, and compare the selected voltage level with the predetermined voltage value VREF.

Noteworthily, when the upper gate switch SW1 turns on (in the first motor driving state, and PWM=High), the motor current is normally flowing from motor's terminal OUTA to terminal OUTB, and when the upper gate switch SW1 turns off (in the first motor driving state, and PWM=Low), the direction of the motor current won't be changed abruptly (still from terminal OUTA to terminal OUTB) because the motor can be considered as an inductance load by nature. At this moment, the motor current can keep conducting by going through the lower gate switch SW4 by utilizing the inherent body diode of the lower gate switch SW4, so the continuity of the motor current can be kept. However, the voltage drop across the body diode of the lower gate switch is relatively high (compared with the voltage drop while the switch is turned on), and when the motor current is relatively large, lots of unwanted heat can be produced owing to the voltage drop of the body diode, and the lower gate switch can be burned, or at least the power loss can be relatively large and the ambient temperature can be improperly high. Therefore, while the circuit 40 operated in the first motor driving state, and PWM=Low, the lower gate switch SW4 will be turned on, so the power loss produced by the motor current can be made less, and the continuity of the motor current can be maintained.

To achieve the objective of the present invention, the magnitude of the motor current IL has to be detected. Noteworthily, there are several different methods being utilized to measure the magnitude of the motor current IL, and these techniques of motor current measurement should be readily understood by the people of common knowledge in the art, and won't be detailed further. According to the U.S. patent application Ser. No. 12/512,024, which is submitted by the same inventors of the present invention, the magnitude of the motor current IL can be conveniently measured by detecting the voltage level of a terminal of the DC motor (like the terminal OUTA or OUTB of the motor MOTOR0). For explaining the operating principles of the present invention, the motor driving method disclosed as follows is to apply the current measuring method disclosed in the U.S. patent application Ser. No. 12/512,024, and other methods for current measurement can also be applied to the present invention, and the performance will be equally well. In brief, U.S. patent application Ser. No. 12/512,024 applies the terminal voltage of the DC motor current to compare with a reference voltage, because the terminal voltage of the DC motor is perfectly proportional to the magnitude of the motor current. For example, while the motor operates in the first motor driving state, the power switches SW1 and SW4 will be turned on or off in turn, the power switch SW2 will be on and the power switch SW3 will be off all the time, and the terminal OUTB is selected to detect the motor current level. Since while in the first motor driving state, the power switch SW2 is kept in the on state, the voltage measurement at terminal OUTB will not be disturbed by the switching operation of the power switch SW2, or be affected by some other interference sources, and all the current flowing through the DC motor MOTOR0 will also flow through the power switch SW2, so by measuring the voltage level of terminal OUTB, the magnitude of the motor current IL can be detected. Similarly, while the motor operates in the second motor driving state, the power switches SW3 and SW2 will be turned on or off in turn, the power switch SW4 will be on and the power switch SW1 will be off all the time, and the terminal OUTA is selected to detect the motor current level. Since while in the second motor driving state, the power switch SW4 is kept in the on state, and all the current flowing through the DC motor MOTOR0 will also flow through the power switch SW4, by measuring the voltage level of terminal OUTA, the magnitude of the motor current IL can be detected, and the measurement will not be disturbed by the switching operation of the power switch SW4, or be affected by some other interference sources.

Preferably, the present invention utilizes a comparator to compare the voltage level of a terminal (OUTA or OUTB) of the motor MOTOR0 with a predetermined voltage level, which is set to be 0 volt. At this moment, if the magnitude of the motor current IL is 0 Amp, the comparator will switch its output state to indicate that a reverse current is about to be happened. Meanwhile, the control unit 404 will control the switching operations of the power switches SW1~SW4 to prevent the happening of the reverse current, according to the output of the comparator (or the comparing result of the comparator), to prevent the happening of the reverse current. In other words, the present invention turns off a lower gate switch when the reverse current is about to be happened (in the first motor driving state, the lower gate switch is the power switch SW4; in the second motor driving state, the lower gate switch is the power switch SW2), such that the reverse current can be completely prevented, and the magnitude of the motor current IL is kept at 0 Amp till the end of the PWM cycle. When SW1 and SW3 and SW4 are all being turned off and only SW2 is turned on at this moment (in the first motor driving state) or when SW3 and SW1 and SW2 are all being turned off and only SW4 is turned on at this moment (in the second motor driving state), the voltage of the Back Electromotive Force VBEMF cannot see any conducting loop (or path) in the circuit, and the terminal OUTA (while operating in the first motor driving state) or terminal OUTB (while operating in the second motor driving state) will become a high impedance node (also called "floating node" or "Hi-Z node"), then the voltage level of the high impedance node will be equal to the Back Electromotive Force VBEMF, and the motor current IL can be kept at 0 Amp or somewhat larger.

Noteworthily, there are several benefits for the DC motor control circuit 40 to turn off the related lower gate switch when the motor current IL decreases to 0 Amp. For example, the evolution of the motor current IL relative to time can be kept continuous. In other words, when the motor current IL is 0 Amp, the inductive energy remained in the equivalent inductor LEQ becomes minimal, and won't invoke a voltage surge and waste extra power. Also, given the determined voltage is 0 Volt, the comparator can directly take the voltage of the ground GND as one of the inputs of the comparator, and the circuit can be simplified. Therefore, preferably, the DC motor control circuit 40 turns a specific lower gate switch off to completely avoid the reverse current when the motor current IL decreases to 0 Amp. On the other hand, preferably, the DC motor control circuit 40 can also turn off the specific lower gate switch when the motor current IL is about to be equal to 0 Amp, and this alternative method can be utilized to compensate the delay phenomena of the control signal as characterized by the frequency response of the corresponding control loop. In this case, the process of turning off the lower gate switch is to be initiated earlier to compensate for the delay, and the predetermined voltage VREF is a voltage source slightly larger than 0 Volt.

Figure 5:
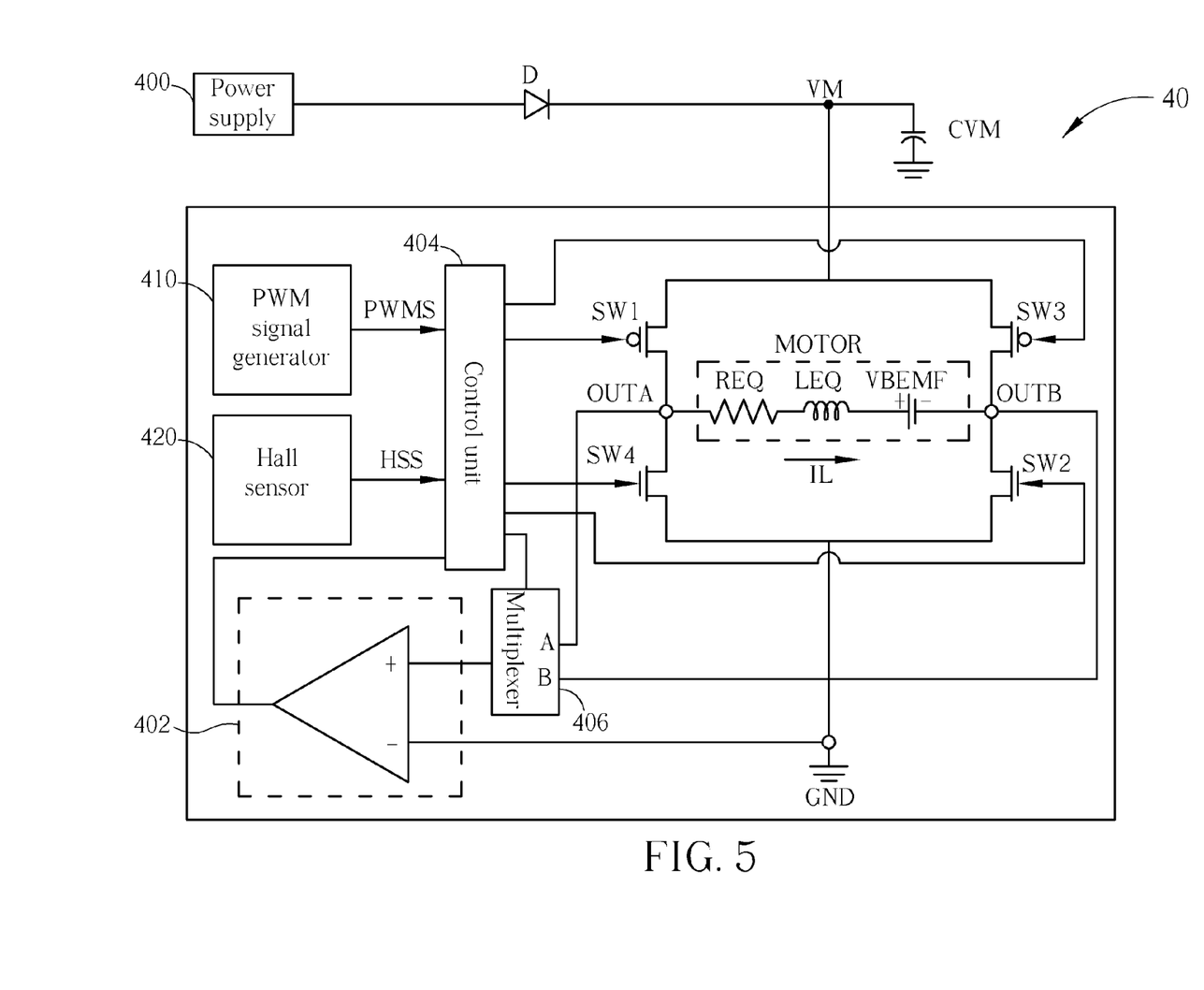
FIG. 5 illustrates a schematic diagram of the DC motor control circuit of FIG. 4.

Please refer to FIG. 5, which illustrates a schematic diagram of a DC motor control circuit 40 according to an embodiment of the present invention. Compared with FIG. 4, the comparing unit 402 has been replaced by a voltage comparator COMP, and the predetermined voltage value VREF has been set to be equal to 0 volt (assuming the control signal delay can be ignored). Therefore, the inverting input of the comparator COMP can be connected directly to a ground end GND. In other words, the terminal voltage (OUTA or OUTB) of the motor MOTOR0 is to be compared with the 0 volt, and this procedure is equivalent to compare the motor current IL with a reference current value of 0 Amp. Therefore, when the motor current is equal to or less than 0 Amp, the control unit 404 will immediately turn off a lower gate switch (in the first motor driving state, this lower gate switch is the power switch SW4, and in the second motor driving state, this lower gate switch is the power switch SW2) to shut down the reverse current path and avoid the happening of reverse current.

Figure 6:
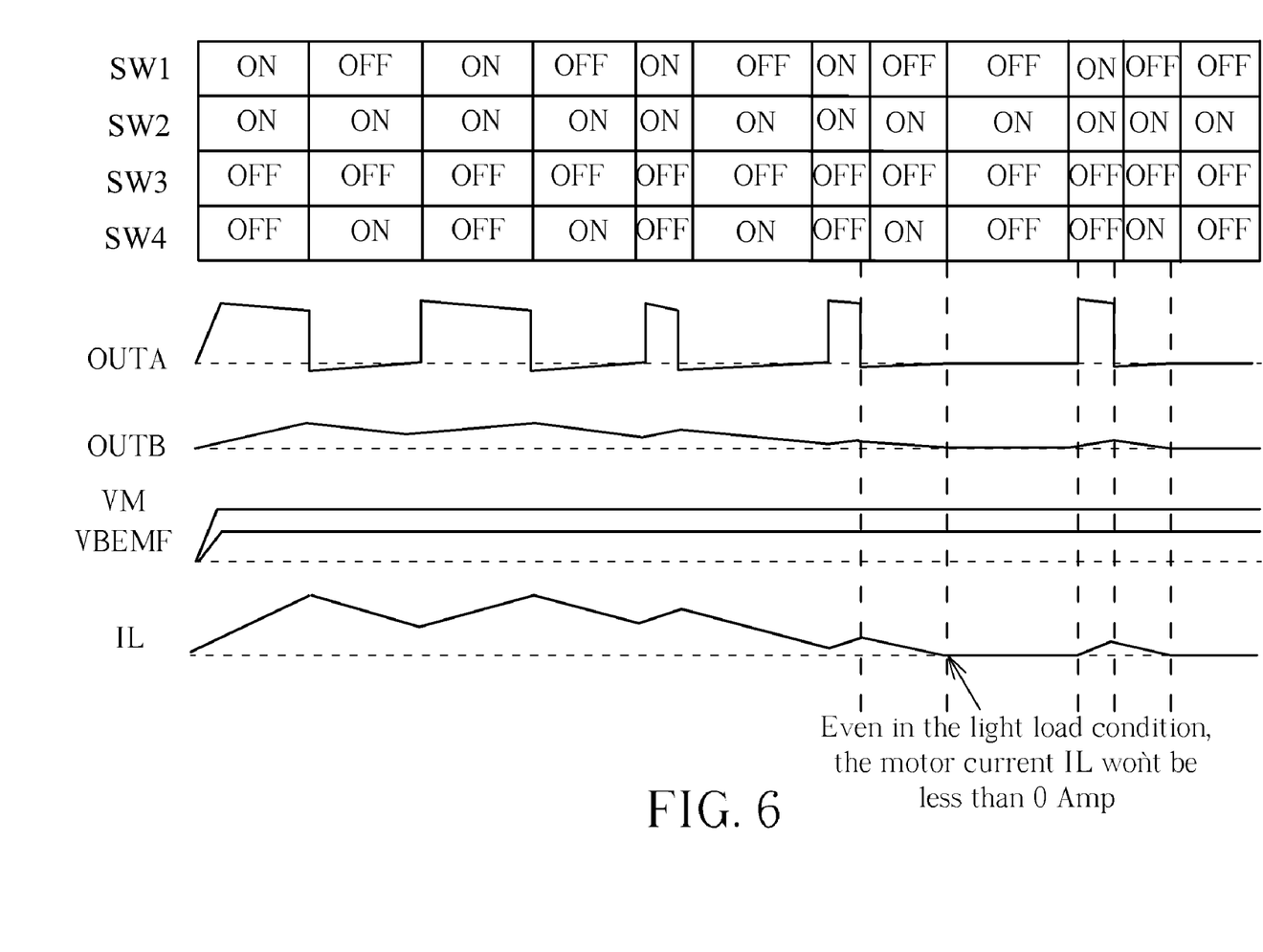
FIG. 6 illustrates timing diagrams of states of power switches and related circuit nodes in the DC motor circuit of FIG. 4 while transferring from heavy load to light load.

Please refer to FIG. 6, which illustrates timing diagrams of the states of the power switches SW1~SW4 and the related circuit nodes in the DC motor circuit 40 while transferring from heavy load to light load (PWM duty from High Duty to Low Duty). As shown in FIG. 6, while operating in the first motor driving state, the comparing unit 402 can notify the control unit 404 when the motor current IL reaches 0 Amp, and the control unit 404 can turn off the lower gate switch SW4 immediately, such that the reverse current can be stopped. The DC motor circuit 40 can always maintain the motor current IL to be greater than or equal to 0 Amp throughout the PWM cycle. As can be observed, the same result and benefit can also be applied to the second motor driving state, and won't be detailed further.

Figure 7:
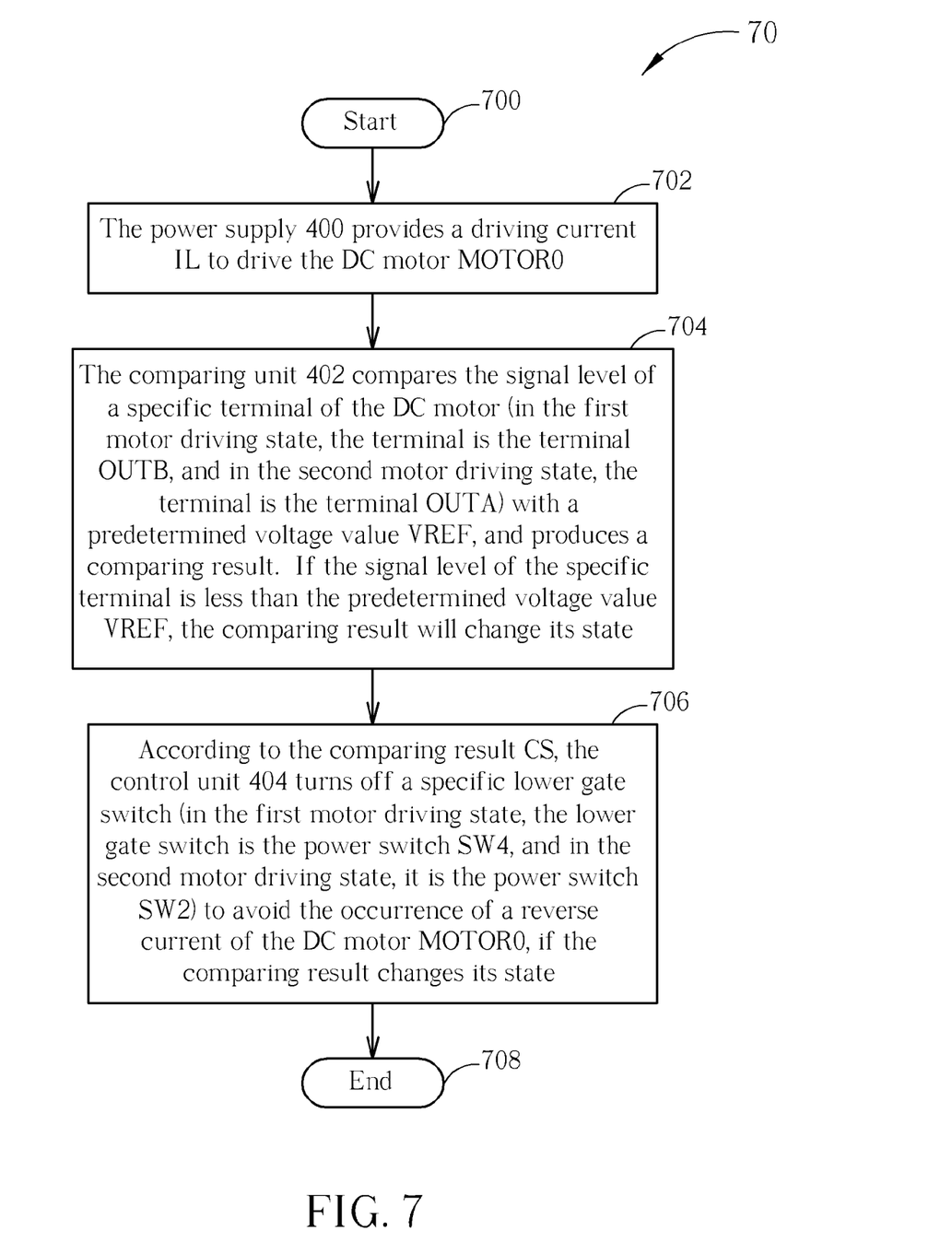
FIG. 7 illustrates a schematic diagram of a control process according to an embodiment of the present invention.

To sum up, according to the operations of the DC motor circuit 40, a method of preventing the reverse current induced from the Back Electromotive Force can be derived for the present invention. The method can be used to prevent the occurrence of the reverse current right before the motor current IL decreased to a negative value. Please refer to FIG. 7, which illustrates a schematic diagram of a control process 70 according to an embodiment of the present invention. The process 70 comprises the following steps:

STEP 700: Start.

STEP 702: The power supply 400 provides a driving current IL to drive the DC motor MOTOR0.

STEP 704: The comparing unit 402 compares the signal level of a specific terminal of the DC motor (in the first motor driving state, the terminal is the terminal OUTB, and in the second motor driving state, the terminal is the terminal OUTA) with a predetermined voltage value VREF, and produces a comparing result. If the signal level of the specific terminal is less than the predetermined voltage value VREF, the comparing result will change its state.

STEP 706: According to the comparing result CS, the control unit 404 turns off a specific lower gate switch (in the first motor driving state, the lower gate switch is the power switch SW4, and in the second motor driving state, it is the power switch SW2) to avoid the occurrence of a reverse current of the DC motor MOTOR0, if the comparing result changes its state.

STEP 708: End.

According to process 70, firstly, a control circuit 40 is supplied to drive the DC motor MOTOR0. Next, the signal level of the terminal (OUTA or OUTB) is to be compared with a predetermined voltage value VREF, and a comparing result is produced. Finally, according to the comparing result, the control circuit 40 can control the switching operations of the power switch SW1~SW4 to present the occurrence of the reverse current. Also, according to the present invention, the process 70 and the associated motor control circuit 40 can directly detect the magnitude of the motor current IL by sensing the voltage level of a specific terminal of the motor (terminal OUTA or OUTB), and when the DC motor MOTOR0 becomes light load, the motor current IL can be effectively controlled to be greater than or equal to 0 Amp, such that the reverse current has no chance to damage the DC motor.

For simplicity, the present invention utilizes a voltage comparator to detect the occurrence of the reverse current, and shuts down possible conducting path for the reverse current by turning off a lower gate switch. Compared with the prior art, the present invention has the following merits:

1. The present invention completely solves the issue of reverse current, and no chance is left for the reverse current to occur.
2. The architecture of the present invention is very simple and compact, and does not sacrifice any existing functions of the motor.
3. A bypass capacitor of large capacitance is not required on the power supply end to protect the power supply device, such that the cost can be saved.
4. When the load is changed from heavy load to light load, or from light load to heavy load, or the motor circuit experiences a sudden Power ON event or a sudden Power OFF event, the reverse current still won't be happened, and the motor can run more smoothly, and the power efficiency can be increased.

To sum up, the present invention completely solves the issue of reverse current induced by the Back Electromotive Force. The performance of the motor circuit won't be disturbed by the reverse current and the motor circuit won't be damaged by the reverse current, either, and the user's convenience can be greatly advanced.

Those skilled in the art will readily observe that numerous modifications and alterations of the device and method may be made while retaining the teachings of the invention.

What is claimed is:

1. A motor driving method for avoiding occurrence of reverse current induced by Back Electromotive Force, comprising:
   providing a driving current to drive a direct-current (DC) motor;
   comparing a signal level of a terminal of the DC motor with a predetermined voltage value to produce a comparing result; and
   controlling a specific lower gate switch to avoid the occurrence of the reverse current of the DC motor according to the comparing result by controlling the current level of the reverse current to approach a predetermined current level while the comparing result indicates that the signal level of the terminal of the DC motor is less than or equal to the predetermined voltage value.

2. The motor driving of claim 1, wherein the signal level of the terminal of the DC motor is corresponding to the current level of the DC motor.

3. The motor driving method of claim 1, wherein the predetermined voltage value is equal to 0 Volt.

4. The motor driving method of claim 1, wherein the predetermined current level is equal to 0 Amp.

5. The motor driving method of claim 4, wherein the step of controlling the current level of the reverse current to approach the predetermined current level is to turn off a reverse current path opposite to the normal current direction of the driving current.

6. A circuit for driving a direct-current (DC) motor, for avoiding occurrence of reverse current induced by Back Electromotive Force, comprising:
   a power supply unit for providing a driving current to drive a DC motor;
   a comparing unit for comparing a signal level of a terminal of the DC motor with a predetermined voltage value to produce a comparing result; and
   a control unit for controlling a specific lower gate switch to avoid the occurrence of the reverse current of the DC motor according to the comparing result by controlling a current level of the reverse current to approach a predetermined current level while the comparing result indicates that the signal level of the terminal of the DC motor is less than or equal to the predetermined voltage value.

7. The circuit of claim 6, wherein the signal level of the terminal of the DC motor is corresponding to a current level of the DC motor.

8. The circuit of claim 6, wherein the predetermined voltage value is equal to 0 Volt.

9. The circuit of claim 6, wherein the predetermined current level is equal to 0 Amp.

10. The circuit of claim 9, wherein the control unit is utilized for turning off a reverse current path opposite to the normal current direction of the driving current.

11. The circuit of claim 6 further comprising a plurality of power switches for controlling conduction of the driving current.

* * * * *